(12) United States Patent
Hagh et al.

(10) Patent No.: US 10,079,746 B2
(45) Date of Patent: Sep. 18, 2018

(54) SYSTEM AND METHOD FOR TESTING DATA CHANNEL BANDWIDTH, PACKET LOSS, LATENCY AND JITTER

(71) Applicant: Nvidia Corporation, Santa Clara, CA (US)

(72) Inventors: Reza Marandian Hagh, San Jose, CA (US); Xuezhou Ma, Santa Clara, CA (US); Sudhakar Aluri, Hyderabad (IN); Thomas Meier, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 163 days.

(21) Appl. No.: 14/852,023

(22) Filed: Sep. 11, 2015

(65) Prior Publication Data

US 2017/0078180 A1     Mar. 16, 2017

(51) Int. Cl.
*H04L 12/26* (2006.01)
*H04L 29/06* (2006.01)

(52) U.S. Cl.
CPC ............ *H04L 43/10* (2013.01); *H04L 43/087* (2013.01); *H04L 43/0829* (2013.01); *H04L 43/0882* (2013.01); *H04L 43/0888* (2013.01); *H04L 43/50* (2013.01); *H04L 65/60* (2013.01)

(58) Field of Classification Search
None
See application file for complete search history.

(56) References Cited

U.S. PATENT DOCUMENTS

| | | | | |
|---|---|---|---|---|
| 2002/0099854 A1* | 7/2002 | Jorgensen | ................ | H04L 1/20 709/249 |
| 2014/0269401 A1* | 9/2014 | Gondi | ................ | H04L 43/0876 370/253 |
| 2015/0016250 A1* | 1/2015 | Flinta | ................ | H04L 43/0888 370/230 |

OTHER PUBLICATIONS

Mascolo, S., et al., "TCP Westwood: Bandwidth Estimation for Enhanced Transport over Wireless Links," ACM, 2001, pp. 287-297.
Johnsson, A., "Bandwidth Measurements in Wired and Wireless Networks," Maelardalen University Licentiate Thesis No. 48, Section 7 Paper C: DietTopp: A first implementation and evaluation of a simplified bandwidth measurement method, Apr. 2005, 118 pages, Department of Computer Science and Electronics, Vaesteras, Sweden.
Lee, H.K., et al., "Bandwidth Estimation in Wireless LANs for Multimedia Streaming Services," Dec. 21, 2006, 4 pages.
Li, M., et al., "WBest: A Bandwidth Estimation Tool for IEEE 802.11 Wireless Networks," Proceedings of 33rd IEEE Conference on Local Computer Networks, Oct. 14-16, 2008, 8 pages.
Yuan, Z., et al., "A Novel Bandwidth Estimation Algorithm for IEEE 802.11 TCP Data Transmissions," WCNC 2012 Workshop on Wireless Vehicular Communications and Networks, IEEE, pp. 377-382.

\* cited by examiner

*Primary Examiner* — Kouroush Mohebbi

(57) ABSTRACT

A system and method for testing a data channel are provided. In one embodiment, the method includes: (1) transmitting groups of increasing numbers of probing packets of a uniform load over successive time periods over the data channel and (2) determining a bandwidth of the data channel based on receive times and loads of at least some of successfully received ones of the groups.

20 Claims, 4 Drawing Sheets

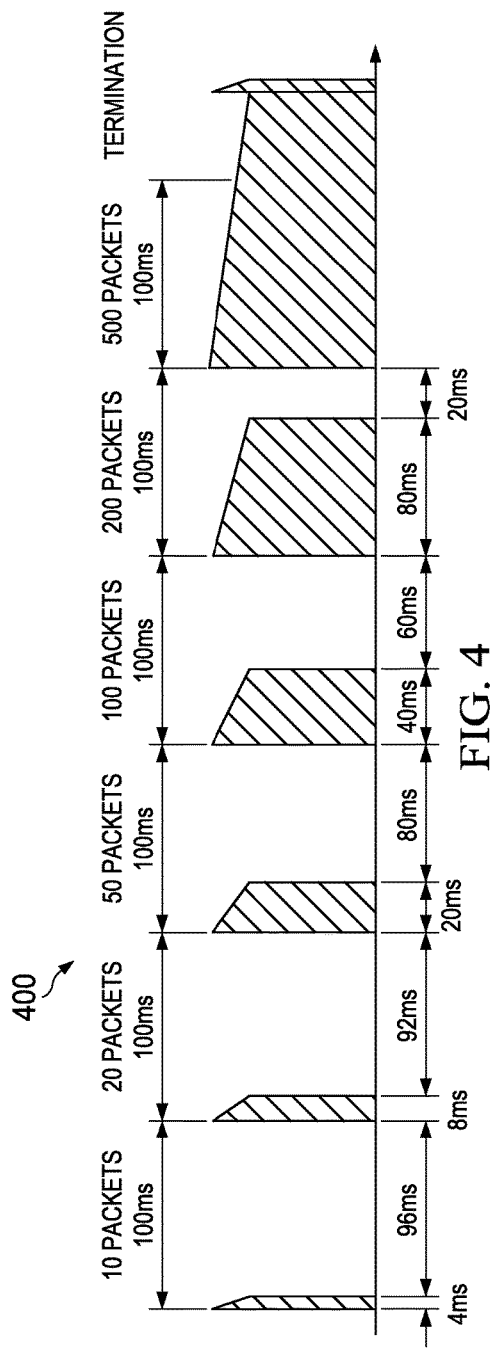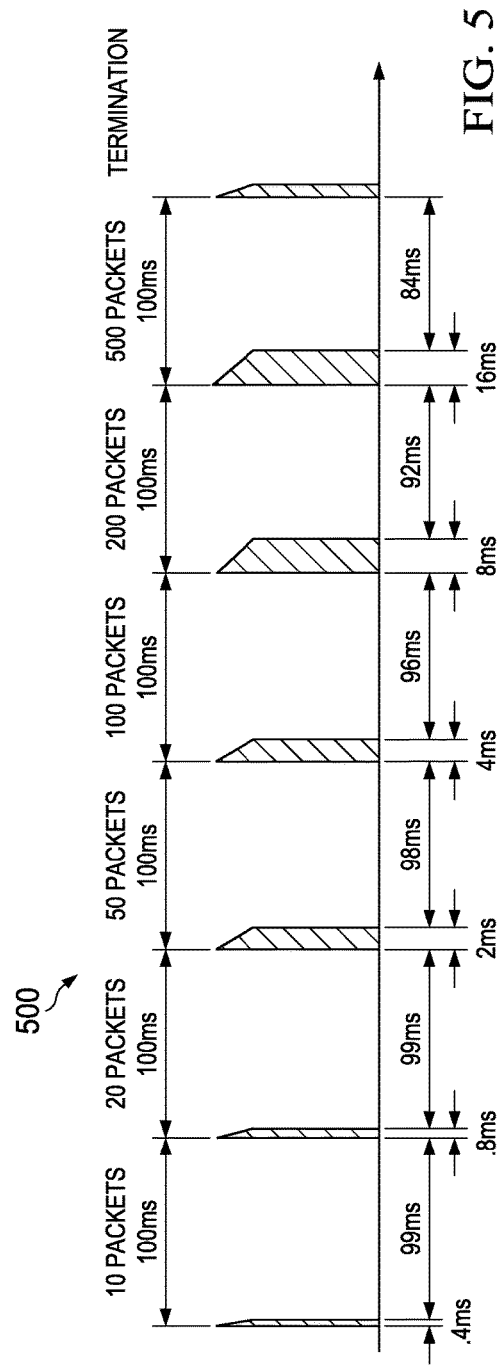

SYSTEM AND METHOD FOR TESTING DATA CHANNEL BANDWIDTH, PACKET LOSS, LATENCY AND JITTER

TECHNICAL FIELD

This application is directed, in general, to data communication and, more specifically, to a system and method for testing a data channel of a network.

BACKGROUND

Game streaming, such as carried out by NVIDIA's GRID and PC2Shield platforms, is a challenging issue when it is conducted over the Internet or other networks having time-varying characteristics. While these networks are well-suited for transporting data, the rate at which they transport data is not constant. Variable latency (delay) and jitter (rapid variations in latency) present ongoing issues for time-sensitive data and impair quality of service (QoS).

Not only must these networks bear traffic that changes unpredictably, but any given data channel between a transmitter (e.g., server) and a receiver (e.g., client) is likely to include a variety of physical links of sundry types and capacities, such as Ethernet, 2.4 GHz or 5 GHz WiFi, and cellular connections such as Long-Term Evolution (LTE) with different protocol layers. Adding to the complexity is that, if the receiver is mobile, the physical links are likely to change as the receiver roams. Accordingly, to enhance user experience, streaming parameters should be chosen carefully to provide an acceptable bandwidth, packet loss rate, latency and jitter. Once an acceptable data channel has been established, the transmitter may adjust its transmission parameters to optimize its transmission to suit the established data channel. Accurately testing data channels is important, because modern games need exceptionally good data channel connectivity so that gameplay is enjoyable. Various approaches and corresponding tools have been developed to test the bandwidth available in a data channel.

Some of the approaches involve using "probing" data packets to evaluate bandwidth. DietTOPP (Johnsson, et al., "DietTopp: A First Implementation and Evaluation of a Simplified Bandwidth Measurement Method," In proc. of the Second Swedish National Computer Networking Workshop (SNCNW), Karlstad, 2004) and WBest (Li, et al., "WBest: a Bandwidth Estimation Tool for IEEE 802.11 Wireless Networks," In Proceedings of 33rd IEEE Conference on Local Computer Networks (LCN), Montreal, Quebec, Canada, 2008) are two popular probing-based approaches. DietTOPP estimates available bandwidth by comparing and adapted probing rate and the corresponding data throughput. WBest uses a probing packet-pair dispersion technique to estimate the effective capacity of a wireless network and a probing packet train technique to infer mean and standard deviations of available bandwidth.

Various approaches and tools have been developed that do not use probing packets. For this reason, such approaches and tools are better regarded as performing bandwidth estimation rather than bandwidth testing. Some of these approaches are "single-layer" approaches, such as those that measure the Transmission Control Protocol (TCP) abstraction layer, e.g., Mascolo, et al., "TCP Westwood: Bandwidth Estimation for Enhanced Transport over Wireless Links," MobiCom '01, pp. 287-297 (2001), and TCP in the context of IEEE 802.11, e.g., Yuan, et al., "A Novel Bandwidth Estimation Algorithm for IEEE 802.11 TCP Data Transmissions," Wireless Communications and Networking Conference Workshops (WCNCW), pp. 377-382 (2012). Unfortunately, single-layer approaches do not accurately estimate the bandwidth of a data channel having links of disparate physical types with different abstraction layers, e.g., User Datagram Protocol (UDP). "Cross-layer" approaches do exist, e.g., IdleGap (Lee, et al., "Bandwidth Estimation in Wireless LANs for Multimedia Streaming Services," In Proc. of IEEE ICME, July 2006, pp. 1181-1184 (2006)). Unfortunately, IdleGap obtains the wireless link idle rate from the Network Allocation Vector (NAV) and transmits it to the application layer. This requires additional data to be transmitted, which is intrusive and adds overhead into the channel. Further, the estimates IdleGap produces are dependent how lower layers of the network have been implemented. Thus, the estimates may not be reliable.

SUMMARY

One aspect provides a method of testing a data channel. In one embodiment, the method includes: (1) transmitting groups of increasing numbers of probing packets of a uniform load over successive time periods over the data channel and (2) determining a bandwidth of the data channel based on receive times and loads of at least some of successfully received ones of the groups.

Another aspect provides a receiver for testing a data channel. In one embodiment, the receiver includes: (1) a physical interface configured to receive groups of increasing numbers of probing packets of a uniform load over successive time periods over the data channel and (2) a bandwidth tester configured to determine the bandwidth of a data channel based on receive times and loads of at least some of successfully received ones of the groups.

Yet another aspect provides a transmitter for testing a data channel. In one embodiment, the transmitter includes: (1) a physical interface configured to transmit groups of increasing numbers of probing packets of a uniform load over successive time periods over the data channel to a receiver and (2) a streaming rate setter configured to set a streaming rate for the data channel based on a bandwidth of the data channel that is measured based on receive times and lengths of at least some of successfully received ones of the groups.

BRIEF DESCRIPTION

Reference is now made to the following descriptions taken in conjunction with the accompanying drawings, in which:

FIGS. 3-5 are illustrations of embodiments of probing packet groups for determining the bandwidths of data channels.

DETAILED DESCRIPTION

As stated above, various approaches and corresponding tools have been developed to test or estimate the bandwidth available in a data channel to bear user data. However, the conventional approaches described in the Background above are designed for data channels of a specific physical type or employing a particular transmission protocol. They are not well-suited for testing data channels having a variety of physical layers and protocols.

Introduced herein are various embodiments of a system and method for testing the bandwidth, packet loss, delay and jitter of a data channel. Certain of the embodiments provide one or more of the following advantages.

First, certain of the embodiments cover a relatively wide range of channels with different bandwidth, delay and packet loss characteristics.

Second, certain of the embodiments are agnostic to both network type (Wi-Fi, Ethernet, LTE) and number of links. As a result, the embodiments may be used in a variety of platforms.

Third, certain of the embodiments converge quickly, such that a channel bandwidth may be determined quickly. In some embodiments, the system and method are designed to run at startup, such that their output may be employed to set subsequent transmission parameters. A fast convergence results in an improved user experience. Certain embodiments are capable of converging within a second of the beginning of the test.

Fourth, certain of the embodiments are particularly accurate. Experiments with channel emulators show certain embodiments to be accurate for streaming applications.

Fifth, certain of the embodiments are flexible. Certain embodiments are distributed between a transmitter and a receiver. However, the receiver does not need to be informed of the details of the probing packets and their time distributions, which allows the transmitter to be easy to maintain and upgrade. In some embodiments, the transmitter may employ different patterns of probing packets based on data channel conditions to improve accuracy.

And sixth, unlike the complex and slow conventional algorithms that require receiver feedback, certain of the embodiments do not require any feedback from the receiver. Early termination, described below, may be employed to terminate a test when channel bandwidth is relatively low and higher numbers of probing packets are not required.

Before illustrating and describing certain embodiments of the system and method, a network providing a data channel that can be tested in terms of bandwidth, packet loss, latency and jitter will be illustrated and described.

Figure 1:
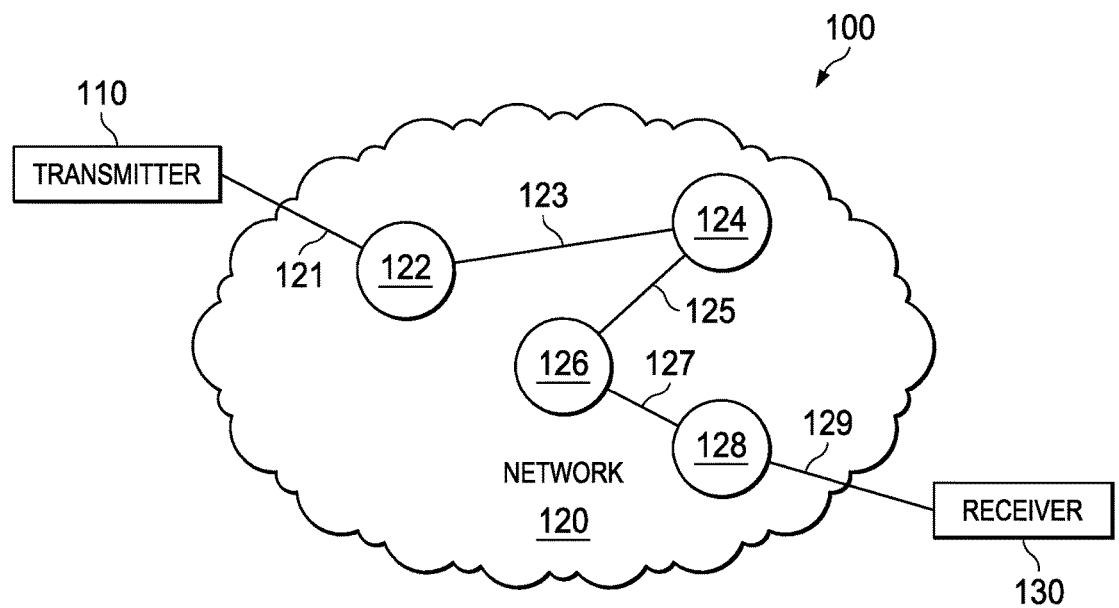
FIG. 1 is a block diagram of a portion of a network in which a data channel having physical links of multiple types exists.

FIG. 1 is a block diagram of a network 120 and a client-server architecture system 100 that communicates through the network 120. The network 120 may be a wired network, a wireless network or a hybrid network having both wired and wireless networks.

The server-client architecture system 100 includes a transmitter 110 and a receiver 130. The transmitter 110 is configured to transmit a series of probing packets to the receiver 130 via a data channel to measure various characteristics of the data channel before launching a streaming application. It is noted that the transmitted probing packets are different from data, e.g., video and audio data, packets of a streaming application. The system 100 is freely scalable and the transmitter 110 has a capacity to provide probing packets to many receivers simultaneously.

The receiver 130 is configured to receive the probing packets from the transmitter 110 to measure various characteristics of the data channel. The receiver 130 may be an end-user device such as a desktop or laptop personal computer, a tablet, a smartphone or a smart television.

In the illustrated embodiment, the data channel in the network 120 includes multiple physical links 121, 123, 125, 127, 129 connected by multiple routers 122, 124, 126, 128.

The physical links 121, 123, 125, 127, 129 may be of various mediums or types, including Ethernet, Wi-Fi, and cellular connections, such as LTE. Traffic passing through these links may use various protocols, including TCP and UDP.

Certain embodiments of the system and method will now be illustrated and described. The illustrated embodiments test a data channel of a network such as the network 120 for various channel characteristics. The test is carried out at startup, before launching a streaming application.

Figure 2A:
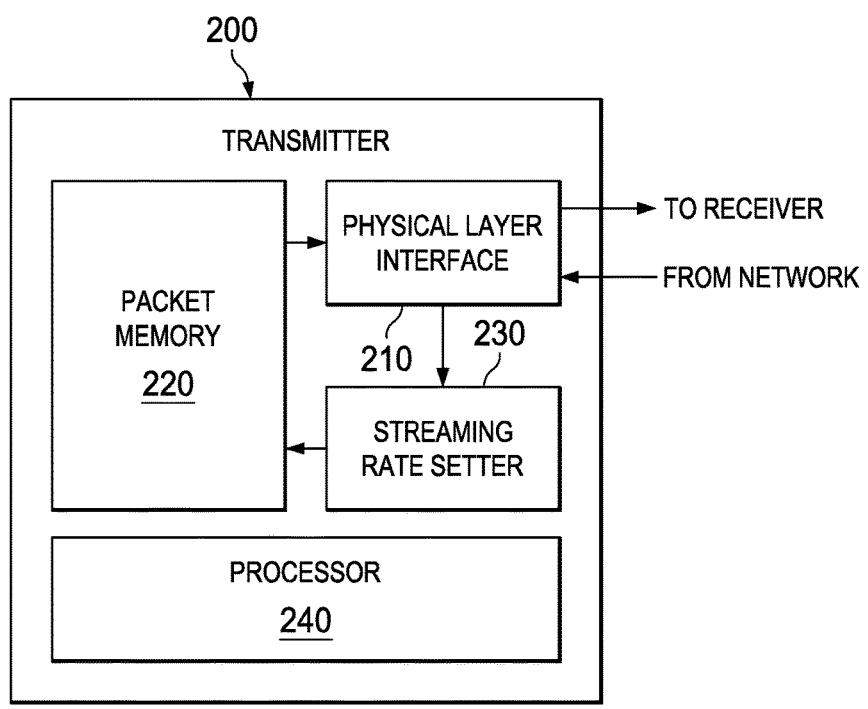
FIGS. 2A and 2B are block diagrams of respective embodiments of a transmitter and receiver for testing the bandwidth, packet loss, latency and jitter of a data channel.
Figure 2B:
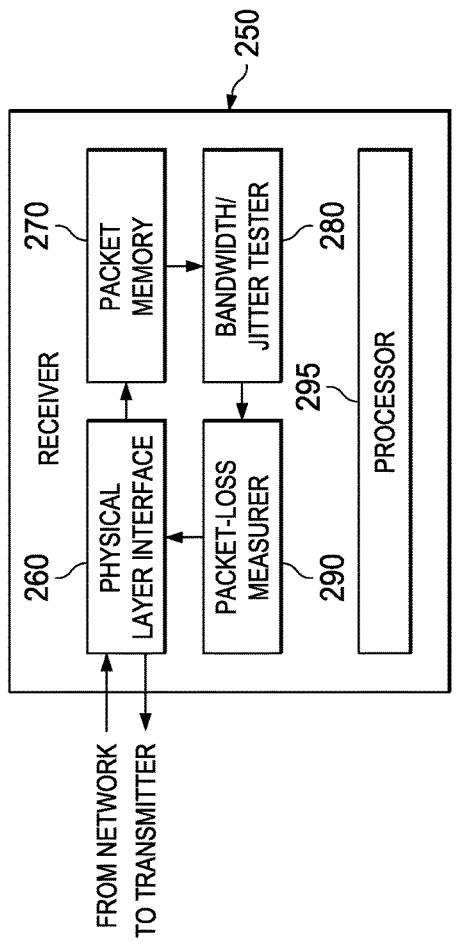

FIGS. 2A and 2B are block diagrams of respective embodiments of a transmitter 200 and receiver 250 for testing the bandwidth, packet loss, latency and jitter of a data channel.

In FIG. 2A, the transmitter 200 includes a physical layer interface 210, a packet memory 220, a streaming rate setter 230, and a processor 240. The physical layer interface 210 is configured to transmit groups of increasing numbers of probing packets of a uniform load to a receiver over successive time periods via a data channel. In the illustrated embodiment, the successive time periods are equally spaced in time. In one embodiment, the probing packets are tagged such that their respective groups may be identified. The physical layer interface 210 may be a stand-alone module or functions embedded in a network interface card (NIC) (not shown) of the transmitter 200.

In one embodiment, the physical layer interface 210 is further configured to terminate transmissions of the probing packet groups early, i.e. before transmitting all the groups, when it detects a group that does not have all of its probing packets received within the time period. This feature prevents flooding a relatively low bandwidth channel with too much data.

Once the data channel's bandwidth is determined, the physical interface 210 is configured to transmit, at a preferred streaming rate, another group of tagged probing packets to the receiver 250 for measuring a packet loss of the data channel. In one embodiment, the streaming rate is set based on the determined bandwidth.

The packet memory 220 is configured to temporarily store the probing packets to be transmitted to the receiver 250. In one embodiment, the packet memory 220 is in the form of a buffer. The packet memory 220 may be located in a NIC or the processor 240.

The streaming rate setter 230 is configured to set a streaming rate for the data channel based on the bandwidth of the data channel that is measured based on receive times and loads of successfully received probing packet groups. In one embodiment, the streaming rate setter 230 is configured to set the streaming rate from 5% to 70% of the determined channel bandwidth depending on a network type.

"Receive time" refers to a time period between the first packet and the last packet of a probing packet group are received, and "load" refers to a total size of a probing packet groups. "Successfully received probing packet groups" are probing packet groups that have all of their probing packets received within their respective time periods.

In the illustrated embodiment, receive times and loads of only some of the successfully received groups are used to determine the bandwidth of the data channel. This is because a successfully received group may still have a high error margin if its receive time only accounts for a small fraction of the time period. In such an embodiment, "some of the successfully received groups" refer to some of the successfully received probing packet groups whose receive times are longer than a minimum time-period utilization threshold, e.g., 10% of the time period.

In FIG. 2B, the receiver 250 includes a physical layer interface 260, a packet memory 270, a bandwidth/jitter tester 280, a packet loss measurer 290, and a processor 295. The physical layer interface 260 is configured to receive, from the transmitter 200, the groups of increasing numbers of probing packets of the uniform load over the successive time periods via the data channel. As the successive time periods are equally spaced in time, each has an equal length. The physical layer interface 260 may be a stand-alone module or may be built into a network interface card (NIC) (not shown) of the receiver 250.

The packet memory 270 is configured to temporarily store the received probing packets. In one embodiment, the packet memory 270 is in the form of a buffer. The packet memory 270 may be located in a NIC or the processor 295.

The bandwidth tester 280 is configured to determine the bandwidth of the data channel based on receive times and loads of the successfully received probing packet groups. In the illustrated embodiment, receive times and loads of only some of the successfully received groups, i.e. some of the successfully received probing packet groups whose receive times are longer than a minimum time-period utilization threshold, are used to determine the bandwidth of the data channel to minimize the error margin.

Using the receive times and loads of some of the successfully received groups, throughputs of those groups are determined. Throughput_i is defined as the throughput of group i, one of some of the successfully received probing packet group, and is determined by:

Throughput_$i$=number_of_bits_Probing group_$i$/
(Time_Last_Rcvd_packet_Probing group_$i$–
Time_First_Rcvd_packet_Probing group_$i$), where number of_bits_Probing group_i represents the amount of data in bits in the probing group i, and Time_Last_Rcvd_packet_Probing group_i and Time_First_Rcvd_packet_Probing group_i are the respective times when the last packet and first packets of the probing group i have been received.

Once throughputs of all relevant probing packet groups are determined, the bandwidth tester 280 takes an average of the throughputs as the throughputs are instantaneous in nature. This average represents the bandwidth of the data channel. In one embodiment, the bandwidth tester 280 employs a smoothing filter, e.g., IIR filter, for an average function.

In the illustrated embodiment, the packet loss measurer 290 is configured to measure a packet loss rate of the data channel at a preferred streaming rate. As mentioned above, the preferred streaming rate is set based on the determined bandwidth.

In one embodiment, the packet loss rate is determined by dividing a number of missing or late loss-calculation packets with a total number of the loss-calculation packets. A packet is considered late if the packet is not received within a certain time period from its preceding packet. In one embodiment, any loss-calculation packet that does not arrive within 40 ms of its preceding packet is considered late. This time can be adjusted based on various video streaming parameters.

The packet loss measurer 290 is also configured to measure network jitter of the data channel based on the packet spacing at the receiver and the transmitter. In one embodiment, the jitter calculation method as described in Internet Engineering Task Force (IETF) RFC3550 as of the filing data of this application is used to measure the jitter of the data channel. IETF's RFC3550 is incorporated herein by reference.

Figure 3:
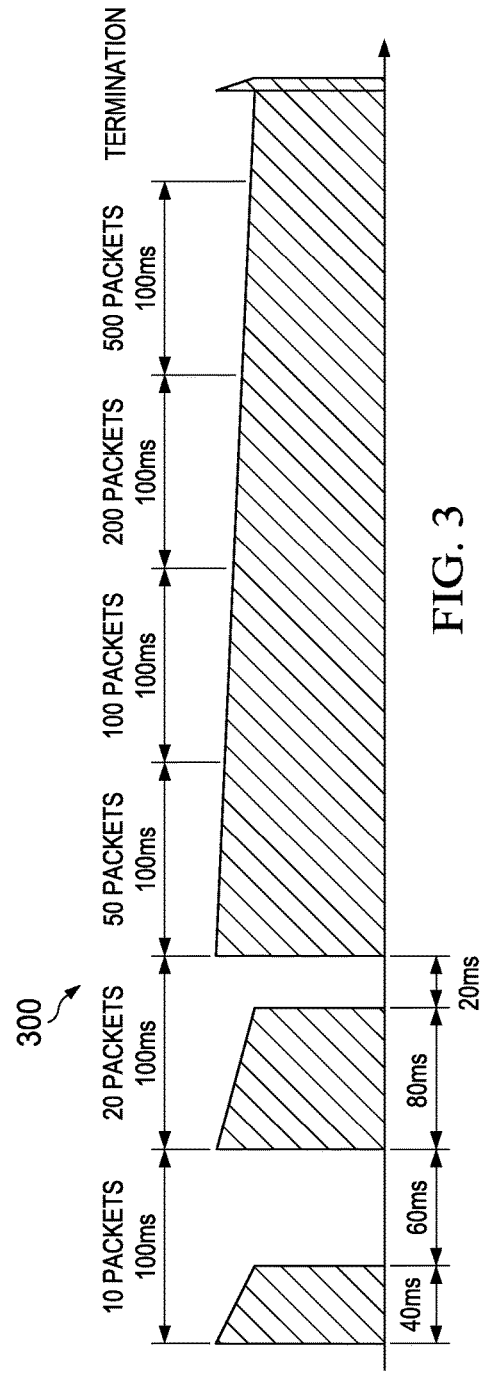

FIGS. 3-5 are embodiments of probing packet groups for determining bandwidths of various data channels. Each embodiment shows six groups of probing packets of increasing loads being transmitted over six successive time periods. In the illustrated embodiments, the first groups include ten probing packets, the second groups include 20 probing packets, the third groups include 50 probing packets, the fourth groups include 100 probing packets, the fifth groups include 200 probing packets, and the sixth groups include 500 packets. In the illustrated embodiments, each probing packets has a fixed load of 1000 bytes, and each time period is 100 ms long. It is assumed that the delay is constant.

It is understood that the load of each probing packet, the number of probing packets in each group, and the length of each time period are not limited to those shown in the illustrated embodiments and may change based on the various factors.

FIG. 3 shows groups of probing packets transmitted over a network via a data channel 300. The first group spans 40 ms, the second group spans 80 ms, and the third, fourth, fifth and sixth groups each spans at least 100 ms. Of these groups, the first and second groups are considered as successfully received and only their receive times and loads are used to determine the throughputs of the group. It is noted that receive times of both the first and second groups are longer than the minimum time-period utilization threshold for this particular embodiment, 10 ms. Once the throughputs are determined, the bandwidth of the channel 300 may be determined.

The bandwidth of the data channel 300 in bit/sec ("bps") is calculated as:

BW=Average[(10×1000×8)/(40 msec),(20×1000×8)/
(80 msec)]=2 Mbps.

Accordingly, the bandwidth of the channel 300 in FIG. 3 is 2 Mbps.

In one embodiment, an occurrence of the third group, which does not receive all of its probing packets within in the given time period, may trigger the transmitter to issue an early termination command that stops transmissions of the subsequent groups.

FIG. 4 shows groups of probing packets transmitted over a network via a data channel 400. The first group spans 4 ms, the second group spans 8 ms, and the third group spans 20 ms, the fourth group spans 40 ms, the fifth group spans 80 ms, and the sixth group spans at least 100 ms. While the first, second, third, fourth, and fifth groups are successfully received, receive times and loads of only the second, third, fourth, and fifth groups are used for the throughput determination because receive time of the first group was shorter than the minimum time-period utilization threshold of this particular embodiment, i.e. 5 ms. Using the throughputs of the second, third, fourth, and fifth groups, the bandwidth of the channel 400 is determined.

The bandwidth of the data channel 400 in bps is calculated as:

BW=Average[(20×1000×8)/(8 msec),(50×1000×8)/
(20 msec),(100×1000×8)/(40 msec),(200×1000×
8)/(80 msec)]=20 Mbps.

Accordingly, the bandwidth of the channel 400 in FIG. 4 is 20 Mbps.

FIG. 5 shows groups of probing packets transmitted over a network via a data channel 500. The first group spans 0.4 ms, the second group spans 0.8 ms, the third group spans 2 ms, the fourth group spans 4 ms, the fifth group spans 8 ms, and the sixth group spans 16 ms. While all the groups are successfully received, the throughputs of only the fifth and sixths groups are calculated to determine the bandwidth of the channel 500 because receive times of the first, second, third and fourth groups were shorter than the minimum time-period utilization threshold of this particular embodiment, i.e. 5 ms.

The bandwidth of the data channel 500 is determined by averaging the throughputs:

$$BW = \text{Average}[(200 \times 1000 \times 8)/(8 \text{ msec}), (500 \times 1000 \times 8)/(16 \text{ msec})] = 200 \text{ Mbps}.$$

Accordingly, the bandwidth of the channel 500 in FIG. 5 is 200 Mbps.

Figure 6:
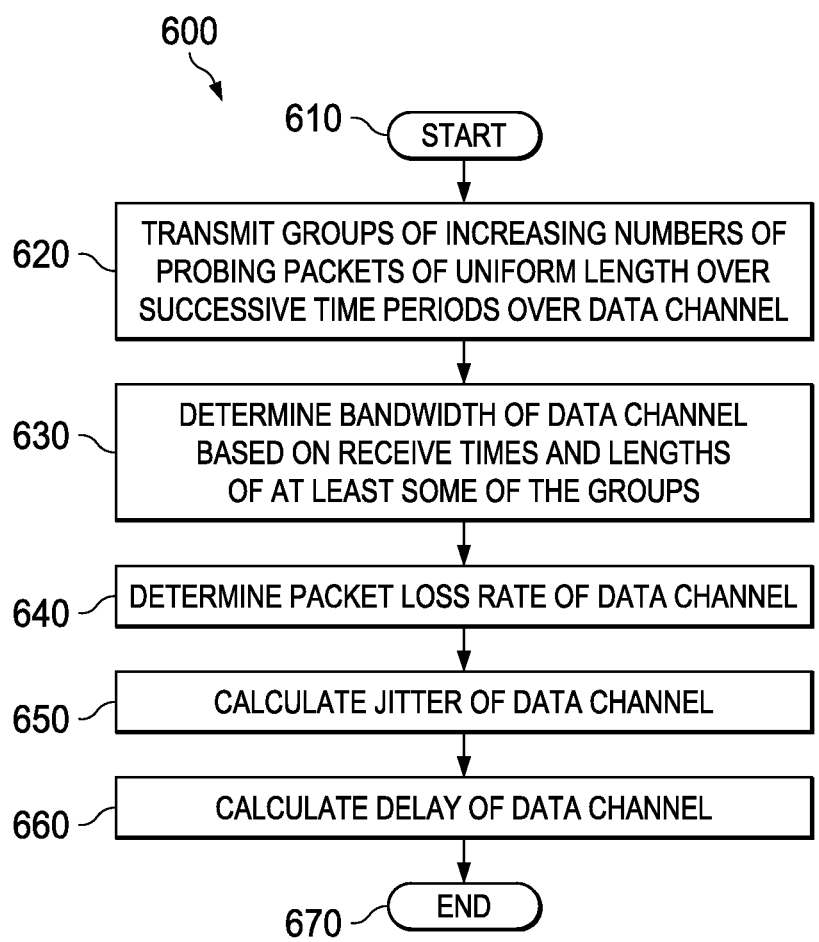
FIG. 6 is a flow diagram of one embodiment of a method of testing the bandwidth, packet loss, latency and jitter of a data channel.

FIG. 6 is a flow diagram of one embodiment of a method of testing a data channel. The disclosed method 600 may be implemented in a network where data such as video and audio data is streamed over a data channel having multiple physical links of multiple types. The method is carried out before launching a streaming application and takes less than one second to complete. The method starts in a start step 610.

In a step 620, groups of increasing numbers of probing packets of a uniform load are transmitted over successive time periods of a uniform length via a data channel. In one embodiment, the uniform load of the probing packets is 1000 bytes, and the uniform length of the time periods is 100 ms.

The number of probing packets in each group increases with each passing time period. As shown in FIGS. 3-5, the number of probing packets may increase randomly. In some embodiments, the number of probing packets may increase in a more predictable way such as in certain multiples or increments.

In a step 630, the bandwidth of the data channel is determined based on receive times and lengths of at least some of the successfully received probing packet groups. As described above, receive times and loads of only some of those successfully received groups, e.g., whose receive times are longer than the minimum time-period utilization threshold, are used to determine the bandwidth.

Using the receive times and loads of some of the successfully received probing packet groups, the groups' throughputs are determined. As described above, the throughput of a group is calculated by dividing the load of the group with the receive time of the group; the load of the group is calculated by multiplying the number of packets in the group with the uniform size of the packets; and the receive time of the group is measured as a time difference between the first packet of the group has been received and the last packet of the groups has been received. As the throughputs represent instantaneous values, they are averaged to determine the bandwidth of the data channel.

Based on the determined bandwidth of the channel, a preferred streaming rate for the channel is determined and set. In one embodiment, the preferred streaming rate can be set between 5% and 70% of the bandwidth of the channel based on a network type.

Using the preferred streaming rate, the packet loss rate of the data channel is determined in step 640. The packet loss rate is calculated by comparing the number of missing or late packets with the total number of the transmitted loss-calculation packets at the preferred rate. In the described embodiment, late packets are treated like lost packets because the data to be streamed through the data channel such as streaming video and audio data is time sensitive content.

In addition to the bandwidth and the packet loss, the method calculates jitter in a step 650. The jitter is calculated based on the method proposed in IETF Request for Comments 3550 (RFC3550) as of the filing date of this application, which is widely accepted in the industry. RFC3550 is incorporated herein by reference.

The method calculates delay of the data channel in a step 660. The delay may be measured using round trip messages through a ping utility. The method ends in a step 670.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The above-described apparatuses and methods or at least a portion thereof may be embodied in or performed by various, such as conventional, digital data processors or computers, wherein the computers are programmed or store executable programs of sequences of software instructions to perform one or more of the steps of the methods, e.g., steps of the method of FIG. 6. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 6, or functions of the apparatuses described herein, e.g., a receiver and a transmitter.

Certain embodiments of the invention further relate to computer storage products with a non-transitory computer-readable medium that have program code thereon for performing various computer-implemented operations that embody the apparatuses, the systems or carry out the steps of the methods set forth herein. For example, a delay estimator and a bandwidth estimator can be implemented as such a computer storage product. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:
1. A method of testing a data channel, comprising:
   transmitting probing packet groups of increasing loads over successive time periods via said data channel, each of said successive time periods having a uniform length; and determining a bandwidth of said data channel based on receive times of only some successfully received ones of said probing packet groups, each of said receive times exceeding a minimum time-period utilization threshold for said successive time periods.

2. The method as recited in claim 1, wherein said determining includes averaging throughputs of said some successfully received ones of said probing packet groups.

3. The method as recited in claim 2, wherein said throughputs are calculated by dividing loads of said some successfully received ones of said probing packet groups with said receive times.

4. The method as recited in claim 1, further comprising determining a streaming rate for said data channel based on said bandwidth.

5. The method as recited in claim 1, further comprising calculating a jitter of said data channel.

6. The method as recited in claim 1, further comprising calculating a delay of said data channel.

7. The method as recited in claim 4, further comprising obtaining a packet loss of said data channel at said streaming rate.

8. The method as recited in claim 6, wherein said calculating said delay includes employing round trip messages through a ping utility.

9. The method as recited in claim 1, wherein said method is carried out before streaming video data.

10. The method as recited in claim 1, wherein said minimum time-period utilization threshold accounts for a fraction of said uniform length.

11. A receiver for testing a data channel, comprising:
a physical interface configured to receive probing packet groups of increasing loads over successive time periods via said data channel, each of said successive time periods having a uniform length; and
a bandwidth tester configured to determine a bandwidth of said data channel based on receive times of only some successfully received ones of said probing packet groups, each of said receive times exceeding a minimum time-period utilization threshold for said successive time periods.

12. The receiver as recited in claim 11, wherein said bandwidth is determined by averaging throughputs of said some successfully received ones of said probing packet groups.

13. The receiver as recited in claim 12, wherein said throughputs are calculated by dividing loads of said some successfully received ones of said probing packet groups with said receive times.

14. The receiver as recited in claim 12, further comprising a packet-loss measurer configured to obtain a packet loss of said data channel at a streaming rate that is calculated based said bandwidth.

15. The receiver as recited in claim 14, wherein said packet-loss measurer is further configured to calculate a jitter of said data channel at said streaming rate.

16. The receiver as recited in claim 12, wherein said receiver is configured to measure a delay of said data channel by employing round trip messages through a ping utility.

17. A transmitter for testing a data channel, comprising:
a physical interface configured to transmit probing packet groups of increasing loads over successive time periods via said data channel to a receiver, each of said successive time periods having a uniform length; and
a streaming rate setter configured to set a streaming rate for said data channel based on a bandwidth of said data channel that is determined based on receive times of only some successfully received ones of said probing packet groups, each of said receive times exceeding a minimum time-period utilization threshold for said successive time periods.

18. The transmitter as recited in claim 17, wherein said physical interface is further configured to terminate a transmission of said probing packet groups when at least one of said groups is not successfully received at said receiver.

19. The transmitter as recited in claim 17, wherein said physical interface is further configured to send a group of tagged, packet-loss packets to said receiver.

20. The transmitter as recited in claim 17, wherein said minimum time-period utilization threshold accounts for a fraction of said uniform length.

* * * * *